(12) United States Patent
Guesnon

(10) Patent No.: US 8,869,901 B2
(45) Date of Patent: Oct. 28, 2014

(54) OFFSHORE DRILLING SYSTEM COMPRISING A HIGH-PRESSURE RISER

(75) Inventor: Jean Guesnon, Chatou (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 427 days.

(21) Appl. No.: 10/891,053

(22) Filed: Jul. 15, 2004

(65) Prior Publication Data

US 2005/0013670 A1      Jan. 20, 2005

(30) Foreign Application Priority Data

Jul. 15, 2003   (FR) ...................................... 03 08637

(51) Int. Cl.
| | |
|---|---|
| *E02D 5/54* | (2006.01) |
| *E02D 15/02* | (2006.01) |
| *F16L 9/04* | (2006.01) |
| *F16L 9/147* | (2006.01) |
| *E21B 17/01* | (2006.01) |

(52) U.S. Cl.
CPC ................. *F16L 9/147* (2013.01); *F16L 9/042* (2013.01); *E21B 17/01* (2013.01)
USPC ............... 166/367; 166/344; 166/345; 175/7; 405/224.2

(58) Field of Classification Search
USPC .............. 166/352, 355, 358, 367; 175/5, 6, 7; 405/224.2–224.4, 195.1; 285/290.1–290.4, 293.1, 222.1–222.5
See application file for complete search history.

(56) References Cited

U.S. PATENT DOCUMENTS

| | | | | |
|---|---|---|---|---|
| 3,532,162 A | * | 10/1970 | Fischer .......................... | 166/360 |
| 3,880,195 A | * | 4/1975 | Goodrich et al. ............. | 138/172 |
| 4,332,509 A | * | 6/1982 | Reynard et al. ............ | 405/168.1 |
| 4,514,245 A | * | 4/1985 | Chabrier ....................... | 156/161 |
| 4,634,314 A | * | 1/1987 | Pierce .......................... | 405/224.2 |
| 4,739,800 A | * | 4/1988 | Baratella ........................ | 138/103 |
| 4,794,988 A | * | 1/1989 | van Bilderbeek ............. | 166/345 |
| 4,821,804 A | * | 4/1989 | Pierce ............................ | 166/367 |
| 5,220,961 A | * | 6/1993 | Guesnon et al. .............. | 166/367 |
| 5,310,007 A | * | 5/1994 | Parikh ............................ | 166/355 |
| 5,330,294 A |   | 7/1994 | Guesnon | |
| 5,439,323 A | * | 8/1995 | Nance ......................... | 405/195.1 |
| 5,447,390 A | * | 9/1995 | Sparks et al. ............... | 405/195.1 |
| 5,524,710 A | * | 6/1996 | Shinn .............................. | 166/348 |
| 5,553,976 A | * | 9/1996 | Korsgaard ................... | 405/195.1 |
| 5,683,530 A | * | 11/1997 | Fawley et al. .................... | 156/94 |
| 6,042,152 A | * | 3/2000 | Baldwin et al. .................. | 285/55 |
| 6,123,114 A | * | 9/2000 | Seguin et al. ................. | 138/124 |
| 6,155,748 A | * | 12/2000 | Allen et al. ................. | 405/195.1 |
| 6,165,586 A | * | 12/2000 | Nouveau et al. .............. | 428/105 |
| 6,354,334 B1 | * | 3/2002 | Ellyin et al. .................. | 138/143 |

(Continued)

*Primary Examiner* — James Sayre
(74) *Attorney, Agent, or Firm* — Antonelli, Terry, Stout & Kraus, LLP.

(57) ABSTRACT

The offshore drilling system comprises a floating drilling vessel 1, a well drilled in the sea bottom 2, a tubular riser extending the well up to the floating vessel, well sealing elements fastened to the end of the riser at the level of floating vessel 1. The riser comprises tubular elements 12 connected to one another by connectors 13 designed to withstand the internal pressure of the well. Tubulars 12 comprise a metallic tubular body hooped by windings of fibers coated with a polymer matrix. The riser comprises several sections, each section consisting of tube elements whose hoop stress is determined as a function of the depth at which the section lies and of the mechanical strength of said metallic tubular body.

21 Claims, 5 Drawing Sheets

(56) References Cited

U.S. PATENT DOCUMENTS

| | | | |
|---|---|---|---|
| 6,745,853 B2 * | 6/2004 | Turner et al. | 175/5 |
| 6,848,863 B2 * | 2/2005 | Karayaka et al. | 405/211 |
| 7,144,048 B2 * | 12/2006 | Humphreys | 285/290.3 |
| 7,188,677 B2 * | 3/2007 | Moe | 166/355 |
| 2004/0086341 A1 * | 5/2004 | Salama et al. | 405/224.2 |
| 2006/0188342 A1 * | 8/2006 | Salama et al. | 405/224.2 |

* cited by examiner

OFFSHORE DRILLING SYSTEM COMPRISING A HIGH-PRESSURE RISER

FIELD OF THE INVENTION

The present invention relates to the sphere of offshore drilling, in particular deep-sea drilling, i.e. at water depths that may reach about 3000 μm. The system according to the invention allows to carry out drilling operations through a water depth, without a subsea wellhead installed on the sea bottom. On the contrary, the wellhead and all its components, notably safety elements such as BOP, are aerial and installed on the floating vessel.

BACKGROUND OF THE INVENTION

In offshore drilling, it is already well-known to use an architecture with an aerial wellhead, but this is possible only under certain conditions:
- when the drilling support is stationary: jackup and rig resting on the bottom,
- with a floating vessel, when the water depth is shallow, the sea conditions mild and/or the pressures of the drilled reservoirs low.

Under such conditions, the tubular riser used through the water depth consists of casing type API tubes identical to those used for casing the walls of the well drilled in the ground. These casing tubes have screwed connectors and are not suited to undergo dynamic stresses.

SUMMARY OF THE INVENTION

The present invention thus relates to an offshore drilling system comprising a floating vessel, a well drilled in the sea bottom, a tubular riser extending the well up to the floating vessel, well sealing elements fastened to the end of the riser at the level of the floating vessel. According to the invention, the riser comprises tubular elements connected to one another by connectors designed to withstand the internal pressure of the well. Said tubulars comprise a metallic tubular body hooped by windings of fibers coated with a polymer matrix. The riser comprises several sections, each section consisting of tube elements whose hoop stress is determined as a function of the depth at which the section lies and of the mechanical strength of said tubular body.

The hoop stress can be obtained by winding under tension of the fibers round the tubular body. The hoop stress can also be obtained by plastic deformation of the tubular body hooped by winding of the fibers.

According to the invention, the metallic tubular body can be of the same steel grade and of constant geometry throughout the riser, and the various sections can have different hoop thicknesses depending on the hoop stress determined.

According to a first variant of the invention, the hoop thickness can be the same throughout the riser, and the various sections can have metallic tubular bodies of different steel grade and/or thickness.

According to a second variant of the invention, the hoop thickness, the steel grade and/or the thickness can be different for all the sections making up the riser.

BRIEF DESCRIPTION OF THE FIGURES

Other features and advantages of the present invention will be clear from reading the description hereafter of a non limitative embodiment illustrated by the accompanying figures, wherein FIG. 1 diagrammatically shows an offshore drilling system according to the prior art, FIG. 2 diagrammatically shows the drilling system according to the invention.

DETAILED DESCRIPTION

Figure 1:
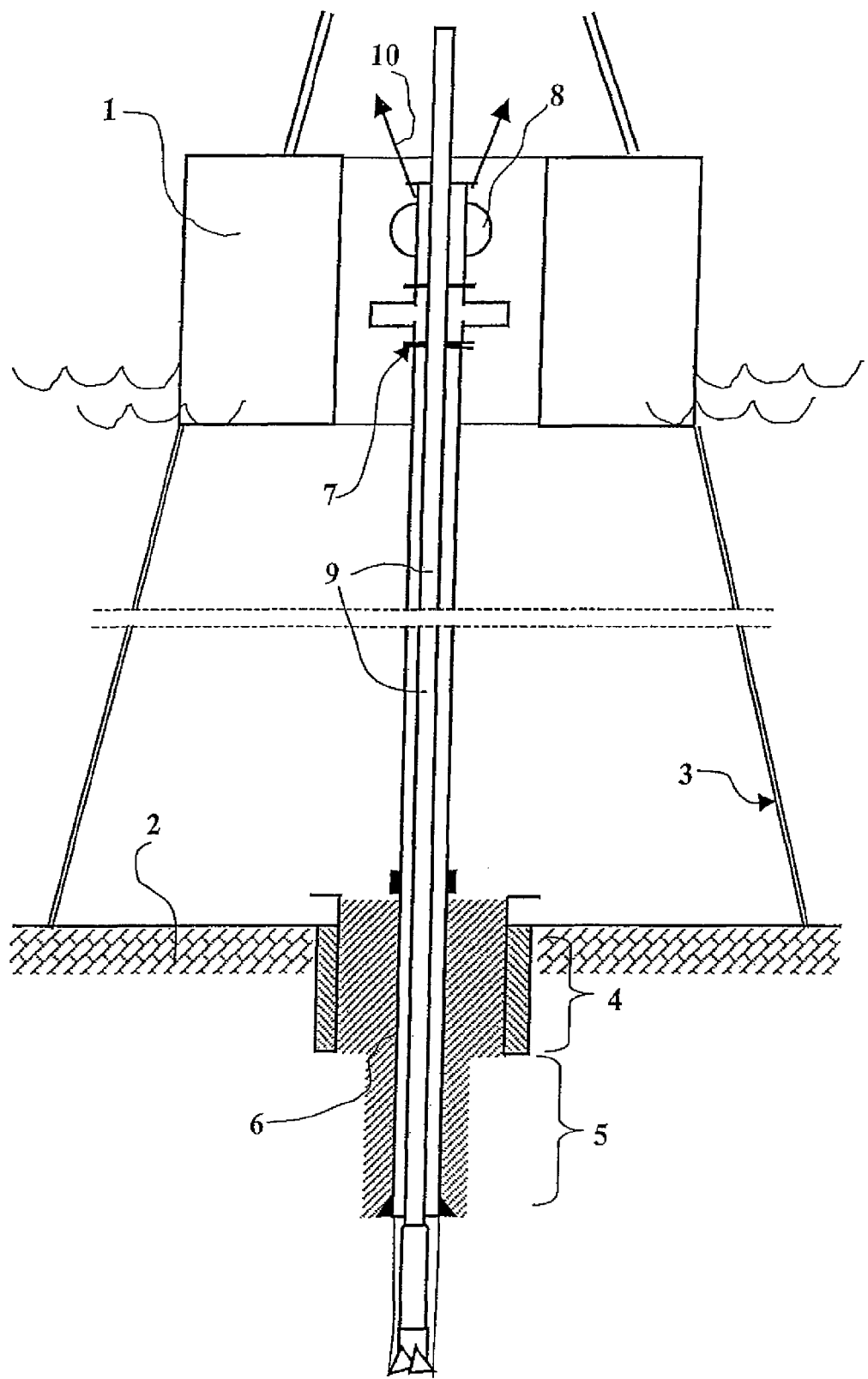

FIG. 1 shows a floating drilling support 1 fastened in relation to sea bottom 2 by anchor means 3. A first well portion 4 has been drilled and cased. The deeper second well portion 5 has been cased by a casing string 6 running up to the surface at the level of the floating vessel. At the top 7 of the string, the wellhead installation comprises a blowout preventer assembly 8 (BOP) allowing, if need be, to secure the well, i.e. to isolate it, whether a drill string 9 is present in the hole or not. The whole string acting as a riser is suspended from tensioning means shown by arrows 10. Thus, the slight vertical displacements (heave) of the drilling support make little impact on the stresses undergone by the riser pipe. However, the tubes assembled to make up string 6 are not able to withstand the high reservoir pressures or to withstand the dynamic loads generated by the action of the swell and the horizontal movements of the floating vessel (surge, sway, . . . ). Besides, although the tube makeup time is acceptable for water depths of the order of or below 1000 m, it is much less economical for greater depths.

The aerial wellhead technique is thus limited in terms of mechanical performance and cannot meet a large number of applications.

Figure 2:
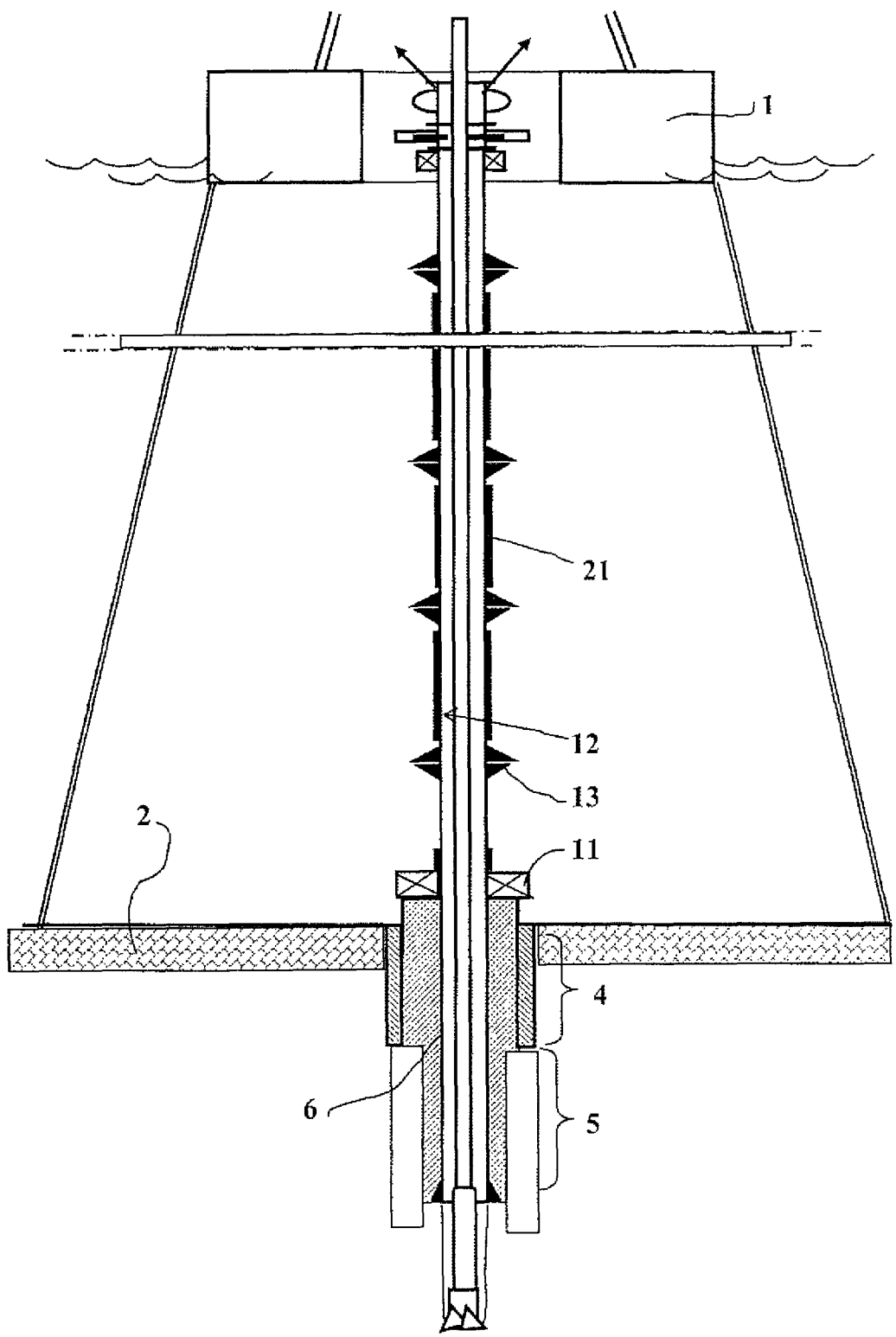

FIG. 2 diagrammatically shows an extension of the aerial wellhead technique for a greater water depth (for example for a water depth greater than 1000 m or 2000 m) and/or a higher reservoir pressure (requiring for example a blowout preventer assembly (BOP) of at least 300 bars, for example a 10000-psi working pressure (690 bars)). Floating vessel 1 carries out the same drilling program as in FIG. 1. Intermediate casing string 6 stops at the level of the sea bottom and is extended, by means of an adapter and/or of a connector 11, by a riser according to the invention consisting of an assembly of tube elements 12 connected to one another by high-pressure connectors 13. According to the invention, it appears that it is possible to have a riser meeting the safety of wells according to the state of the art, and running through water depths of the order of 3000 m. Tube elements whose resistance is optimized by hooping with a composite material 21 consisting of fibers coated with a polymer matrix are therefore used.

A tube hooping technique can consist in winding under tension composite material bands 21 round a metallic tubular body, as described in documents FR-2,828,121, FR-2,828, 262, U.S. Pat. No. 4,514,254.

It is also possible to use a technique known as self-hooping, which consists in creating the hoop stress during hydraulic testing of the tube at a pressure causing the elastic limit in the metallic body to be exceeded. In other words, composite material bands 21 are wound round the metallic tubular body without inducing stresses in the metallic tubular body. A predetermined pressure is then applied within the metallic body so that the metallic body deforms plastically. After return to a zero pressure, residual compressive stresses remain in the metallic body and tensile stresses remain in the composite material bands 21.

The hoop stress designates the compressive stresses in the metallic body, these stresses being induced by the composite material bands 21 under tension wound round the metallic tubular body.

The thickness of the composite material 21 wound round the metallic tubular body, preferably made of steel, is determined as a function of the hoop prestress required for the tube to withstand pressure and tensile stresses according to the state of the art.

Figure 3:
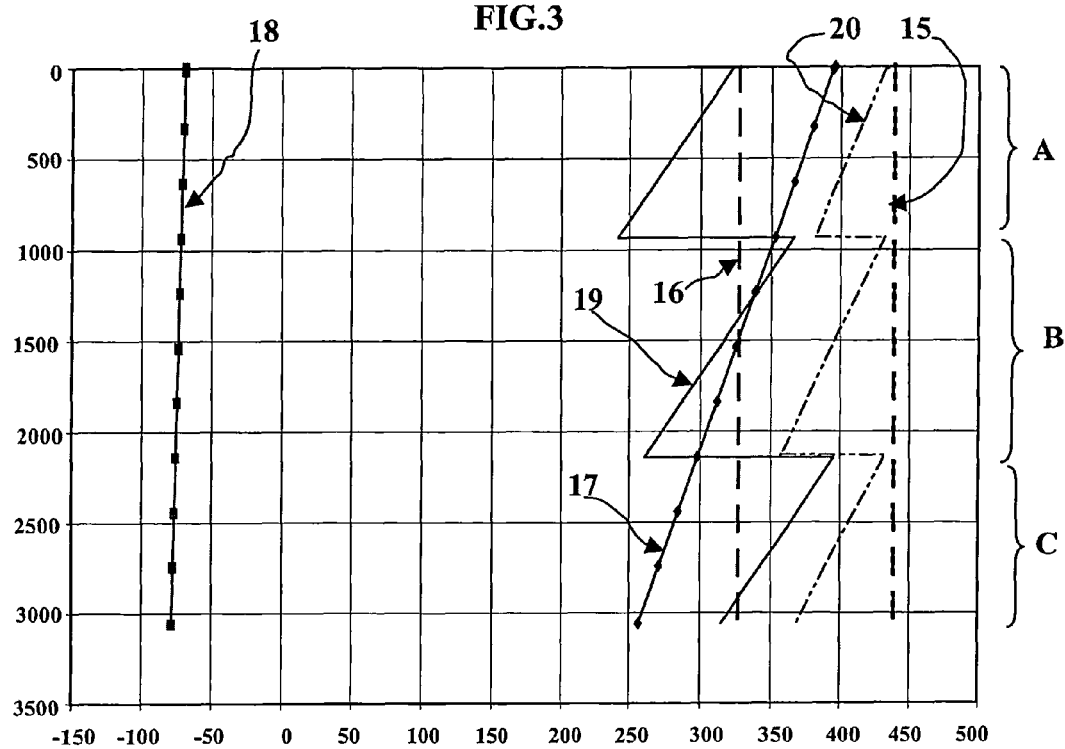
FIG. 3 shows a diagram of the stresses in a tubular riser according to the invention, FIG. 4 diagrammatically shows the drilling system according to one embodiment of the invention, and FIG. 5 diagrammatically shows the drilling system according to another embodiment of the invention.
Figure 4:
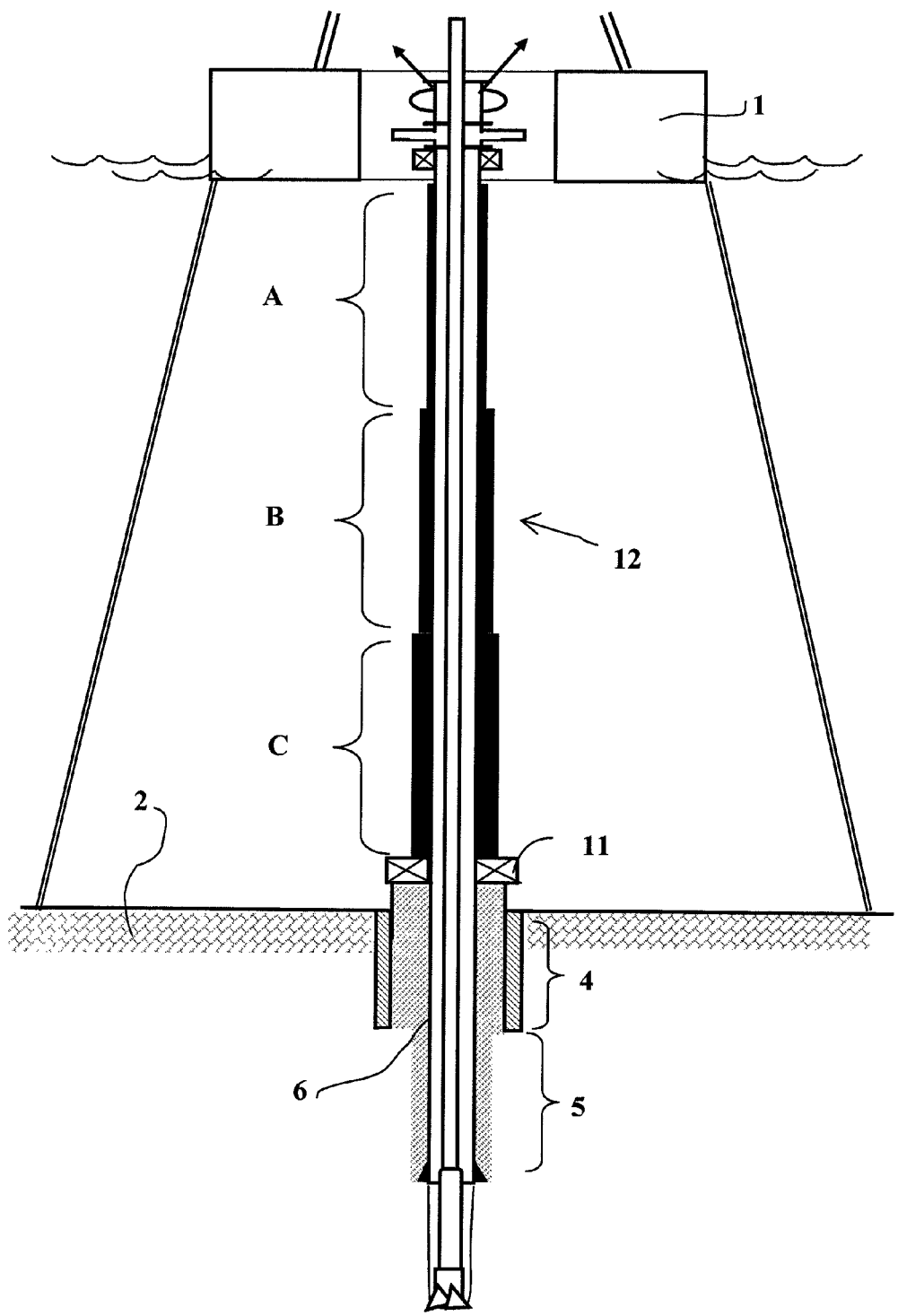
Figure 5:
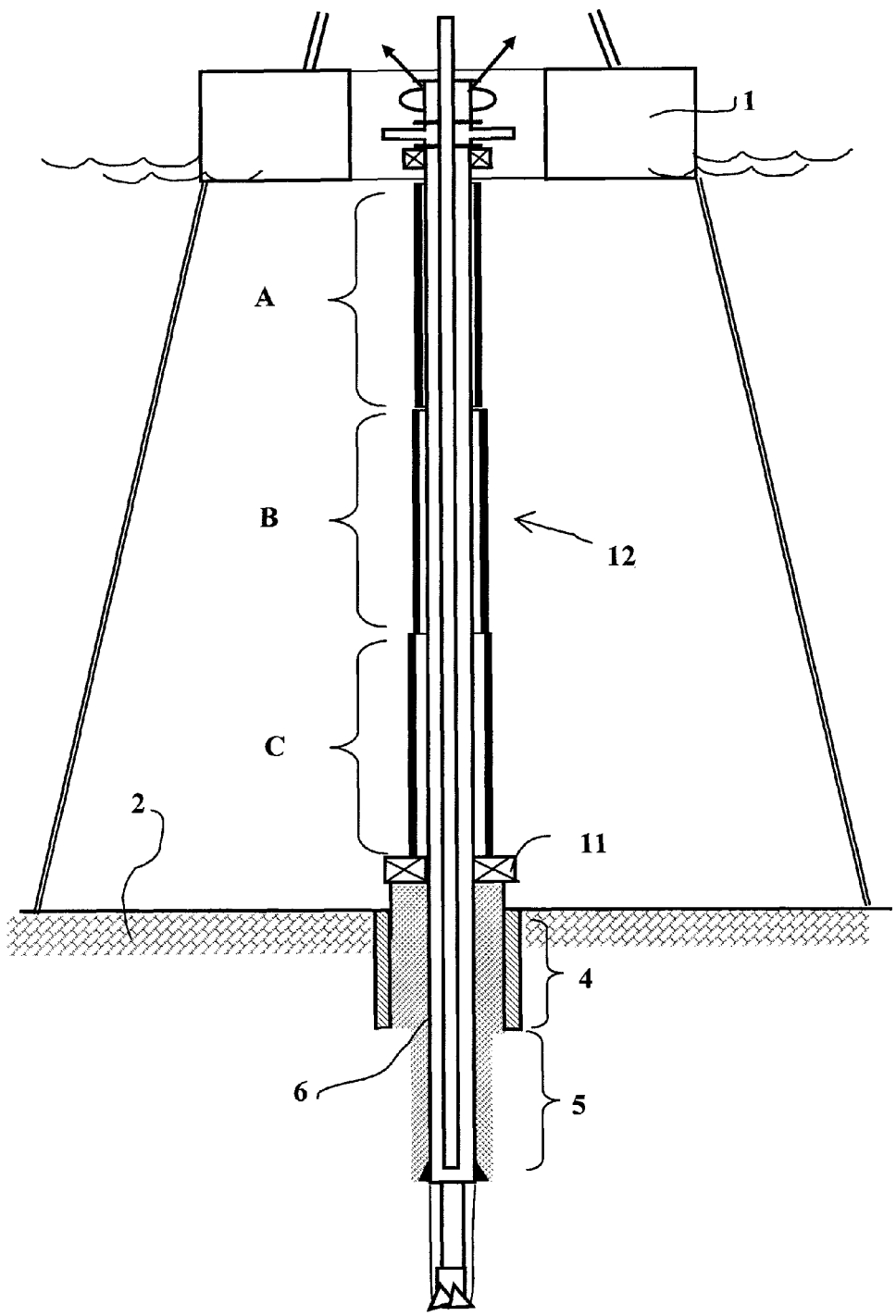

FIG. 3 gives, for a riser architecture example, the stresses (MPa as the abscissa) as a function of depth (ordinate in meters).

The riser according to the invention consists of:
tube elements of length 45 ft (13.7 m),
connectors able to withstand the axial and circumferential loads generated by the 10000 psi (690 bar) maximum pressure inside the riser,
a metallic body of outside diameter 16" (406.4 mm), thickness 11/16" (17.5 mm), made of a C95 API grade steel having a 95000 psi (655 MPa) minimum elastic limit ($Rp_{0.2}$).

Line 16 corresponds to half the elastic limit $Rp_{0.2}$ and line 15 to 2/3 of the elastic limit $Rp_{0.2}$. According to the state of the art, the Von Mises stresses must remain below 2/3 of the elastic limit $Rp_{0.2}$.

Curve 17 shows the axial stresses in the riser.
Curve 18 shows the radial stresses in the riser.
Curve 19 shows the circumferential stresses in the riser.
Curve 20 shows the Von Mises stresses in the riser.

References A, B and C represent the three sections of tube elements that make up the 3000-m long riser. From a single tubular body, the three sections correspond to different hoop stresses depending on depth. The winding tension of the hoop fibers is constant, only the winding thickness decreases with depth: respectively 10 mm, 7.5 mm and 5 mm for sections A, B, C in the example described.

According to the invention, it is also possible to minimize the stresses, notably the Von Mises stresses, while keeping a constant hoop thickness on a metallic tubular body whose thickness varies as a function of the depth at which the sections making up the riser lie. It is also possible to change, for each section, the thickness of the metallic body and the thickness of the composite in order to obtain a weight or cost optimum.

The invention claimed is:

1. An offshore drilling system for water depths greater than 1000 m and for reservoir pressure of at least 10,000 psi, comprising a floating vessel, a well drilled in the sea bottom, a tubular riser extending the well up to the floating vessel, and an aerial wellhead comprising a blowout preventer fastened to the end of the riser at the level of the floating vessel, characterized in that said riser comprises tubular elements connected to one another by high-pressure connectors able to withstand the internal pressure of the well, in that each of said tubular elements comprises a metallic tubular body hooped by windings of fibers coated with a polymer matrix, and in that the riser comprises several sections, each section comprising at least one of said tubular elements and having a hoop stress as a function of the depth at which the section lies and of the mechanical strength of said tubular body, wherein at least one of said several sections has different hoop stress than at least one other of said several sections and wherein the various sections have metallic tubular bodies of the same steel grade and of constant geometry throughout the riser, and the various sections have different hoop thicknesses, the hoop thickness of the several sections decreasing with depth.

2. A drilling system as claimed in claim 1, wherein the hoop stresses are formed by winding fibers under tension round the tubular body.

3. A drilling system as claimed in claim 1, wherein the hoop stresses are formed by plastic deformation of the tubular body hooped by fiber windings.

4. A drilling system as claimed in claim 1, wherein the metallic tubular body is of the same steel grade and of constant geometry throughout the riser, and wherein the various sections have different hoop thicknesses.

5. A drilling system as claimed in claim 4, wherein the hoop thickness of the several sections decreases with depth.

6. A drilling system as claimed in claim 1, wherein the hoop thickness is the same throughout the riser, and wherein the various sections have metallic tubular bodies of different steel grade.

7. A drilling system as claimed in claim 6, wherein the various sections have metallic tubular bodies of different thickness.

8. A drilling system as claimed in claim 1, wherein at least one of the hoop thickness, the steel grade and the thickness of the metallic tubular bodies is different for all the sections making up the riser.

9. A drilling system as claimed in claim 8, wherein the hoop stresses are formed by winding fibers under tension round the tubular body.

10. A drilling system as claimed in claim 8, wherein the hoop stresses are formed by plastic deformation of the tubular body hooped by fiber windings.

11. A drilling system as claimed in claim 8, wherein the riser has a length of more than 1000 m.

12. A drilling system as claimed in claim 8, wherein the riser has a length of more than 2000 m.

13. A drilling system as claimed in claim 8, wherein the hoop thickness is different for the sections making up the riser, and wherein at least one of the steel grade and thickness of the metallic tubular bodies is different for the sections making up the riser.

14. A drilling system as claimed in claim 8, wherein the hoop thickness is different for all the sections making up the riser.

15. A drilling system as claimed in claim 14, wherein the steel grade of the metallic tubular bodies is different for all the sections making up the riser.

16. A drilling system as claimed in claim 8, wherein the steel grade of the metallic tubular bodies is different for all the sections making up the riser.

17. A drilling system as claimed in claim 8, wherein the various sections have metallic tubular bodies of different thickness.

18. A drilling system as claimed in claim 1, wherein the riser has a length of more than 1000 m.

19. A drilling system as claimed in claim 1, wherein the riser has a length of more than 2000 m.

20. A drilling system as claimed in claim 1, wherein the hoop thickness is the same throughout the riser, and wherein the various sections have metallic tubular bodies of different thickness.

21. A drilling system as claimed in claim 1, wherein the hoop stress is constant within each section.

* * * * *